United States Patent
Xu et al.

(10) Patent No.: US 12,152,134 B2
(45) Date of Patent: *Nov. 26, 2024

(54) RUBBER COMPOSITION, PROCESSING METHOD THEREOF, AND HIGH-STRENGTH PRODUCT USING THE SAME

(71) Applicants: HANGZHOU XINGLU TECHNOLOGIES CO., LTD, Zhejinag (CN); SHAOXING PINGHE NEW MATERIAL TECHNOLOGY CO., LTD., Shaoxing (CN)

(72) Inventors: Tao Xu, Hangzhou (CN); Zhi Sheng Fu, Hangzhou (CN); An Yang Wu, Hangzhou (CN)

(73) Assignees: HANGZHOU XINGLU TECHNOLOGY CO., LTD., Hangzhou (CN); SHAOXING PINGHE NEW MATERIAL TECHNOLOGY CO., LTD., Shaoxing (CN)

( * ) Notice: Subject to any disclaimer, the term of this patent is extended or adjusted under 35 U.S.C. 154(b) by 488 days.

This patent is subject to a terminal disclaimer.

(21) Appl. No.: 16/477,414

(22) PCT Filed: Jan. 12, 2018

(86) PCT No.: PCT/CN2018/072379
§ 371 (c)(1),
(2) Date: Jul. 11, 2019

(87) PCT Pub. No.: WO2018/130200
PCT Pub. Date: Jul. 19, 2018

(65) Prior Publication Data
US 2019/0330456 A1    Oct. 31, 2019

(30) Foreign Application Priority Data
Jan. 13, 2017 (CN) .......................... 201710025138.0
Jan. 10, 2018 (CN) .......................... 201810020833.2

(51) Int. Cl.
*C08L 23/06* (2006.01)
*A41D 19/00* (2006.01)
(Continued)

(52) U.S. Cl.
CPC .............. *C08L 23/06* (2013.01); *C08K 3/013* (2018.01); *C08K 3/22* (2013.01); *C08K 3/26* (2013.01); *C08K 5/0016* (2013.01); *C08K 5/005* (2013.01); *C08K 5/01* (2013.01); *C08K 5/14* (2013.01); *C08K 5/3477* (2013.01); *C08K 5/47* (2013.01);
(Continued)

(58) Field of Classification Search
CPC .......... C08L 23/08; C08L 23/16; C08L 23/06; C08L 23/04; C08L 91/00; C08L 71/02; C08K 5/0016; C08K 3/22; C08K 3/346; C08K 5/0025; C08K 3/013; C08K 5/34924; C08K 5/14; C08K 3/04; C08K 3/011; C08K 5/005; C08K 3/06; C08K 3/26; C08K 5/09; C08K 2003/265; C08K 2003/2217; C08K 2003/2206; C08K 2003/2296; C08K 2003/222; C08K 2201/014

See application file for complete search history.

(56) References Cited

U.S. PATENT DOCUMENTS 3,792,192 A * 2/1974 Plate ...................... H01B 13/14
174/102 SC
3,806,558 A    4/1974 Fischer
(Continued)

FOREIGN PATENT DOCUMENTS

CN    1713309 A    12/2005
CN    1780876 A    5/2006
(Continued)

OTHER PUBLICATIONS

CN104877225 machine translation (Year: 2021).*
(Continued)

*Primary Examiner* — Marc S Zimmer
*Assistant Examiner* — Jeffrey S Lenihan
(74) *Attorney, Agent, or Firm* — LKGlobal | Lorenz & Kopf, LLP

(57) ABSTRACT

The present invention discloses a rubber composition. The rubber composition includes a rubber matrix and a crosslinking system. The rubber matrix includes, in parts by weight, the following components: a branched polyethylene with a content represented as A, in which $0<A\leq100$, an EPM with a content represented as B, in which $0\leq B<100$, and an EPDM with a content represented as C, in which $0\leq C<100$. Based on 100 parts by weight of said rubber matrix, the content of the crosslinking system is represented as D: $1\leq D\leq 15$ parts. The crosslinking system includes at least one of a crosslinking agent and an auxiliary crosslinking agent. The branched polyethylene has a degree of branching of not less than 50 branches/1000 carbon atoms, a weight average molecular weight of not less than 50,000, and a Mooney viscosity ML(1+4) at 125° C. of not less than 2. The rubber composition provided by the present invention can effectively solve the problems of low crosslinking efficiency and mechanical strength in the prior art, and simultaneously has good electrical insulation properties and mechanical strength.

20 Claims, No Drawings

(51) Int. Cl.

| | |
|---|---|
| *C08K 3/013* | (2018.01) |
| *C08K 3/22* | (2006.01) |
| *C08K 3/26* | (2006.01) |
| *C08K 5/00* | (2006.01) |
| *C08K 5/01* | (2006.01) |
| *C08K 5/14* | (2006.01) |
| *C08K 5/3477* | (2006.01) |
| *C08K 5/47* | (2006.01) |
| *C08K 5/5419* | (2006.01) |
| *C08L 23/16* | (2006.01) |

(52) U.S. Cl.
CPC ............ *C08K 5/5419* (2013.01); *C08L 23/16* (2013.01); *A41D 19/0055* (2013.01); *C08K 2003/2206* (2013.01); *C08K 2003/2217* (2013.01); *C08K 2003/2234* (2013.01); *C08K 2003/2237* (2013.01); *C08K 2003/265* (2013.01); *C08L 2203/02* (2013.01); *C08L 2205/02* (2013.01); *C08L 2312/08* (2013.01)

(56) References Cited

U.S. PATENT DOCUMENTS

| | | | |
|---|---|---|---|
| 4,128,523 A | 12/1978 | Britton et al. | |
| 5,169,464 A * | 12/1992 | Foldesy | A61F 6/04 |
| | | | 156/244.14 |
| 6,103,658 A | 8/2000 | Mackenzie et al. | |
| 6,455,616 B1 * | 9/2002 | Cogen | C08K 5/14 |
| | | | 524/100 |
| 6,618,861 B2 * | 9/2003 | Saks | A61B 42/10 |
| | | | 2/161.7 |
| 6,660,677 B1 | 12/2003 | Mackenzie et al. | |
| 6,743,862 B2 * | 6/2004 | Hakuta | C08L 23/16 |
| | | | 525/105 |
| 7,241,831 B2 * | 7/2007 | Waddell | C08F 8/20 |
| | | | 524/519 |
| 11,242,450 B2 * | 2/2022 | Xu | C08K 3/013 |
| 11,479,661 B2 * | 10/2022 | Xu | E01D 19/041 |
| 11,634,566 B2 * | 4/2023 | Xu | B60C 1/0016 |
| | | | 525/515 |
| 2006/0074177 A1 | 4/2006 | Dharmarajan et al. | |

FOREIGN PATENT DOCUMENTS

| | | | |
|---|---|---|---|
| CN | 101531725 A | | 9/2009 |
| CN | 101812145 A | | 8/2010 |
| CN | 102086287 A | | 6/2011 |
| CN | 102617938 A | | 8/2012 |
| CN | 102827312 A | | 12/2012 |
| CN | 103980596 A | | 8/2014 |
| CN | 104877225 A | | 9/2015 |
| CN | 104926962 A | | 9/2015 |
| CN | 107556577 A | * | 1/2018 |
| JP | 1136662 A | * | 5/1989 |

OTHER PUBLICATIONS

CN103980596 machine translation (Year: 2021).*
SIPO, International Search Report issued in IA Application No. PCT/CN2018/072379, mailed Apr. 12, 2018.

* cited by examiner

RUBBER COMPOSITION, PROCESSING METHOD THEREOF, AND HIGH-STRENGTH PRODUCT USING THE SAME

CROSS REFERENCE TO RELATED APPLICATIONS

The present application is the U.S. national phase of and claims priority to International Patent Application No. PCT/CN2018/072379 filed Jan. 12, 2018, which claims the benefit of priority from China National application Ser. No. 201710025138.0, filed on Jan. 13, 2017 and China National application Ser. No. 201810020833.2, filed on Jan. 10, 2018, the entire content of each of which is incorporated herein by reference into the present disclosure as if fully set forth herein.

TECHNICAL FIELD

The present invention belongs to the field of rubber, in particular to a rubber composition, and a processing method for obtaining the rubber composition, and further to a high-strength rubber product using the rubber composition, and a production method of the product.

BACKGROUND

The ethylene propylene rubber has good electrical insulation properties and has become a widely used insulating material. The ethylene propylene rubber can be divided into the ethylene propylene monomer (EPM) and the ethylene-propylene-diene monomer (EPDM), wherein the EPM has better electrical insulation properties and aging resistance but has lower vulcanization speed and lower mechanical properties; and the EPDM has higher vulcanization speed and higher mechanical properties but has reduced electrical insulation properties. Therefore, both the EPM and the EPDM have defects in practical application.

The rubber is also greatly used for preparation of condoms. At present, a large number of condoms and gloves are made of natural rubber and are easy to age, and the natural rubber contains a certain amount of protein, thereby causing allergy risk on the human body.

Both the EPM and the EPDM have good aging resistance, but the EPDM contains a third monomer, the molecular chain of the EPDM contains double bonds, the molecular chain of the EPM is completely saturated, and then, the EPM has more excellent aging resistance, so that for an occasion with a higher requirement for aging resistance, improving the aging resistance of the EPDM by means of the EPM is a common technical solution. However, the mechanical strength of the EPM is lower, which will affect the overall physical and mechanical properties.

The EPM is a copolymer of ethylene and propylene, which is a copolymer of ethylene and α-olefin. The copolymer of ethylene and α-olefin is a polymer containing only carbon and hydrogen elements and having a saturated molecular chain. The common types of carbon atoms found in such polymers generally include primary carbon, secondary carbon and tertiary carbon, in which the tertiary carbon atoms are most susceptible to hydrogen abstraction to form free radicals. Accordingly, the proportion of the tertiary carbon atoms in all carbon atoms is generally considered to be a main factor affecting the aging resistance of the copolymer of ethylene and α-olefin. The lower the proportion is, the better the aging resistance will be. The proportion can be expressed by the degree of branching. For example, the EPM having a propylene content of 60% by weight can be calculated to contain 200 propylene units, that is, 200 tertiary carbon atoms or 200 methyl branches, per 1000 carbon atoms, so the degree of branching is 200 branches/1000 carbon atoms. The EPM usually has an ethylene content of 40 to 65% or 40 to 60% by weight, so the degree of branching is generally in the range of 117 to 200 branches/1000 carbon atoms or 133 to 200 branches/1000 carbon atoms. This degree of branching is considered to be higher than that of other common copolymers of ethylene and α-olefin.

In the prior art, the α-olefin in the common copolymers of ethylene and α-olefin may include, in addition to propylene, α-olefin having a carbon atom number of not less than 4, which may be selected from $C_4$-$C_{20}$ α-olefin, and is generally selected from 1-butylene, 1-hexene and 1-octylene. If the degree of branching of a copolymer of ethylene and α-olefin is too low, the melting point and the crystallinity are too high, so it is not suitable for use as a rubber component. If the degree of branching is too high, the content of α-olefin is higher, which leads to higher process difficulty and raw material cost, and lower operability and economical efficiency. In the prior art, polyolefin obtained by copolymerizing ethylene with 1-butylene or ethylene with 1-octylene can be referred to as a polyolefin plastomer or a polyolefin elastomer according to the magnitudes of crystallinity and melting points. Due to their proper crystallinity and melting points, some polyolefin elastomer brands can be well used in combination with the ethylene propylene rubber and have a lower degree of branching, so they are considered to be an ideal material for improving the aging resistance of the ethylene propylene rubber, and can be used in place of the ethylene propylene rubber to some extent. Since a copolymer of ethylene and 1-butylene has more flexible molecular chain, higher rubber elasticity, and better physical and mechanical properties than a copolymer of ethylene and 1-octylene, the polyolefin elastomer commonly used in rubber products is generally a copolymer of ethylene and 1-octylene at present, in which the octylene content in percentage by weight is generally not higher than 45%, and more generally not higher than 40%, and the corresponding degree of branching is generally not higher than 56 branches/1000 carbon atoms, and more generally not higher than 50 branches/1000 carbon atoms, which is much lower than the degree of branching of the EPM. Therefore, the copolymer of ethylene and 1-butylene has excellent aging resistance and good physical and mechanical properties.

Rubbers are usually used after crosslinking. Among common crosslinking methods for the ethylene propylene rubber, peroxide crosslinking or radiation crosslinking can be suitably used for the copolymer of ethylene and α-olefin, both of which mainly comprise: forming a tertiary carbon free radical by hydrogen abstraction from tertiary carbon and then creating a carbon-carbon crosslink by free radical bonding. However, the copolymer of ethylene and 1-octylene (hereinafter referred to as POE) has a small number of tertiary carbon atoms and has long branches attached to the tertiary carbon atoms, so the steric hindrance is large, and free radical reaction is difficult to occur, resulting in difficulty in crosslinking, and affecting the processing efficiency and product properties.

Therefore, there is currently a need for a better technical solution, which can improve the aging resistance of the ethylene propylene rubber while the ethylene propylene rubber has better physical and mechanical properties and crosslinking properties, and is expected to have good properties with respect to specific functional indexes (such as compression set resistance) required for rubber products.

SUMMARY

In view of the problems existing in the prior art, the present invention provides a rubber composition, a processing method, and application thereof. The branched polyethylene having a degree of branching of not less than 50 branches/1000 carbon atoms is used for replacing a part or all of the ethylene propylene rubber, and peroxide crosslinking or radiation crosslinking is used. On the one hand, the rubber composition prepared according to the present invention has higher crosslinking efficiency, electrical insulating property and mechanical strength in a crosslinking reaction process, so that the rubber composition can be used for wires and cables. On the other hand, the rubber composition prepared according to the present invention can be used for manufacturing condoms, gloves, rubber plugs, medical catheters and the like by means of the radiation crosslinking process or the chemical crosslinking process.

In order to achieve the objectives, the present invention uses the following technical solution:

A rubber composition is provided and includes a rubber matrix and a crosslinking system, wherein the rubber matrix includes, in parts by weight, the following components:

a branched polyethylene with a content represented as A, in which $0 < A \leq 100$, an EPM with a content represented as B, in which $0 \leq B < 100$, and an EPDM with a content represented as C, in which $0 \leq C < 100$.

Based on 100 parts by weight of the rubber matrix, the content of the crosslinking system is represented as D: $1 \leq D \leq 15$ parts.

The crosslinking system includes at least one of a crosslinking agent and an auxiliary crosslinking agent. The branched polyethylene has a degree of branching of not less than 50 branches/1000 carbon atoms, a weight average molecular weight of not less than 50,000, and a Mooney viscosity ML(1+4) at 125° C. of not less than 2.

"Branched polyethylene" in the prior art can also refer to a saturated vinyl copolymer with branches in addition to an ethylene homopolymer with branches, such as an ethylene-α-olefin copolymer, which can be POE. Although the POE performs well in physical and mechanical properties and aging resistance, the crosslinking properties are poor. Therefore, although the branched polyethylene of the present invention can include both a branched ethylene homopolymer and the POE, it is preferred that the branched polyethylene includes a high proportion of or exclusively a branched ethylene homopolymer. In a preferred technical solution of the present invention, the branched polyethylene includes exclusively a branched ethylene homopolymer.

In the further elaboration of the technical solution of the present invention, unless otherwise specified, the used branched polyethylene is a branched ethylene homopolymer.

The branched polyethylene used in the present invention is a kind of ethylene homopolymer having a degree of branching of not less than 50 branches/1000 carbon atoms, which may also be referred to as Branched Polyethylene or Branched PE. Currently, the synthesis method mainly comprises the step of catalyzing ethylene homopolymerization based on a "chain walking mechanism" in the presence of a late transition metal catalyst. Preferably, the late transition metal catalyst is an (α-diimine) nickel/palladium catalyst. The nature of the chain walking mechanism refers to the fact that a β-hydrogen elimination reaction and a re-insertion reaction tend to occur in a process of catalyzing olefin polymerization in the presence of a late transition metal catalyst, such as an (α-diimine)nickel/palladium catalyst, thereby generating branches. The branches of the branched polyethylene based on the backbone may have different numbers of carbon atoms, specifically 1 to 6 or more carbon atoms.

The production cost of the (α-diimine) nickel catalyst is significantly lower than that of the (α-diimine) palladium catalyst, and the (α-diimine) nickel catalyst has a high rate and high activity in catalyzing ethylene polymerization, and is thus more suitable for industrial application. Therefore, in the present invention, the (α-diimine) nickel catalyst is preferably used in preparation of the branched polyethylene by catalyzing ethylene polymerization.

The degree of branching of the branched polyethylene used in the present invention is preferably 50 to 130 branches/1000 carbon atoms, further preferably 60 to 130 branches/1000 carbon atoms, and further preferably 60 to 116 branches/1000 carbon atoms. The degree of branching of the branched polyethylene used in the present invention is between the degree of branching of the POE and the degree of branching of the EPM, constituting a new technical solution that is different from the prior art. Therefore, the rubber matrix of present invention has both excellent aging resistance and good crosslinking properties.

The crosslinking properties include factors such as crosslinking density and crosslinking rate, and are the specific properties of the crosslinking capability of the rubber matrix in the processing process.

The branched polyethylene used in the present invention preferably has a methyl branch content of 40% or more or 50% or more, and has a similarity in structure with the EPM. In terms of the crosslinking capability, the degree of branching (the content of tertiary carbon atoms) and the steric hindrance around the tertiary carbon atoms are the two main factors affecting the crosslinking capability of saturated polyolefin. Compared with the EPM, the branched polyethylene used in the present invention has a lower degree of branching, and since the branched polyethylene has branches with the carbon number of not less than 2, the steric hindrance around the tertiary carbon atoms of the branched polyethylene used in the present invention is theoretically greater than that of the EPM. Taking the two factors into account, it can be inferred that the crosslinking capability of the branched polyethylene used in the present invention is weaker than that of the EPM and further weaker than that of the EPDM. However, the actual crosslinking capability of the partially branched polyethylene used in the present invention is close to, and can even be equal to or better than that of the EPDM. This means that the rubber composition of the present invention can achieve good aging resistance while the crosslinking capability is not weakened, and can even have excellent crosslinking properties to achieve unexpected beneficial effects.

This may be explained by the fact that there may be an appropriate number of secondary branch structures on the branched polyethylene used in the preferred technical solution of the present invention. The so-called secondary branch structure refers to a branch structure that further exists on a branch, which is formed in the chain walking process. This structure is also called "branch-on-branch". Because the steric hindrance around the tertiary carbon atoms of the secondary branch is low, a crosslinking reaction is more likely to occur. Having a secondary branch structure is a significant distinction of the branched polyethylene used in the preferred technical solution of the present invention from the EPM or the conventional ethylene-α-olefin copolymer in the prior art.

It is a new technical solution to improve the crosslinking capability of a saturated polyolefin elastomer by using the secondary branch structure with lower steric hindrance. According to the technical solution of the present invention, it is also considered to be within the technical protection scope of the present invention to include a vinyl copolymer having a secondary branch structure or other saturated hydrocarbon polymers in the rubber matrix. The vinyl copolymer refers to a copolymer of ethylene and α-olefin with branches and has a secondary branch structure, wherein the α-olefin with branches may be selected from isobutylene, 3-methyl-1-butene, 4-methyl-1-pentene, 3-methyl-1-pentene, 2-methyl-1-heptene, 3-methyl-1-heptene, 4-methyl-1-heptene, 5-methyl-1-heptene, 6-methyl-1-heptene and the like, and the comonomer may also simultaneously include common linear chain α-olefin.

It is generally believed in the prior art that the branched polyethylene prepared in the presence of the (α-diimine) nickel catalyst is difficult to have a secondary branch structure that is at least difficult to fully identify, and the technical solution of the present invention also provides a new idea for analyzing the structure of the branched polyethylene.

Compared with the ethylene propylene rubber, when the branched polyethylene has an appropriate number of secondary branch structures, the crosslinking point of the branched polyethylene can be generated on the tertiary carbon of the backbone or on the branched tertiary carbon of the secondary structure during the peroxide crosslinking. Therefore, the rubber network formed by the peroxide crosslinking of the branched polyethylene has richer C—C bonding segments between the backbones than the ethylene propylene rubber, which can effectively avoid the stress concentration, and contribute to better mechanical properties.

The branched polyethylene is an ethylene homopolymer and preferably has a degree of branching of 70 to 116 branches/1000 carbon atoms, a weight average molecular weight of 201,000 to 436,000, and a Mooney viscosity ML(1+4) at 125° C. of 23 to 101.

The branched polyethylene is an ethylene homopolymer and preferably has a degree of branching of 80 to 105 branches/1000 carbon atoms, a weight average molecular weight of 250,000 to 400,000, and a Mooney viscosity ML(1+4) at 125° C. of 40 to 95.

The branched polyethylene is an ethylene homopolymer and preferably has a degree of branching of 80 to 105 branches/1000 carbon atoms, a weight average molecular weight of 268,000 to 356,000, and a Mooney viscosity ML(1+4) at 125° C. of 42 to 80.

Based on 100 parts by weight, the rubber matrix includes an branched polyethylene with a content represented as A, in which $10 \leq A \leq 100$, an EPM with a content represented as B, in which $0 \leq B \leq 90$, and an EPDM with a content represented as C, in which $0 \leq C \leq 90$, and the branched polyethylene is an ethylene homopolymer and has a degree of branching of 60 to 130 branches/1000 carbon atoms, a weight average molecular weight of 66,000 to 518,000, and a Mooney viscosity ML(1+4) at 125° C. of 6 to 102.

A third monomer of the EPDM is preferably a diene monomer and specifically can be selected from the group consisting of 5-ethylidene-2-norbornene, 5-vinyl-2-norbornene, dicyclopentadiene, 1,4-hexadiene, 1,5-hexadiene, 1,4-pentadiene, 2-methyl-1,4-pentadiene, 3-methyl-1,4-hexadiene, 4-methyl-1,4-hexadiene, 1,9-decadiene, 5-methylene-2-norbornene, 5-pentylene-2-norbornene, 1,5-cyclooctadiene, 1,4-cyclooctadiene, and the like. Particularly, the ethylene propylene rubber can simultaneously include two or more diene monomers. For example, the ethylene propylene rubber can simultaneously include 5-ethylidene-2-norbornene and 5-vinyl-2-norbornene. The functional group of the diene monomer can play the same role as an intrinsic auxiliary crosslinking agent in peroxide vulcanization to improve the crosslinking efficiency, thereby being favorable for reducing the dosage and residual quantity of required crosslinking agents and auxiliary crosslinking agents and lowering the cost required for adding the crosslinking agents and the auxiliary crosslinking agents.

The weight ratio of the diene monomer in the ethylene propylene rubber is preferably 1% to 14%, more preferably 3% to 10%, and further preferably 4% to 7%.

The crosslinking agent includes at least one of sulfur and a peroxide crosslinking agent.

The peroxide crosslinking agent includes at least one of di-tert-butyl peroxide, dicumyl peroxide, tert-butyl cumyl peroxide, 1,1-di-tert-butyl peroxide-3,3,5-trimethylcyclohexane, 2,5-dimethyl-2,5-di(tert-butylperoxy)hexane, 2,5-dimethyl-2,5-di(tert-butylperoxy)hexyne-3, bis(tert-butylperoxyisopropyl)benzene, 2,5-dimethyl-2,5-bis(benzoylperoxy)hexane, tert-butyl peroxybenzoate, and tert-butylperoxy-2-ethylhexyl carbonate.

The auxiliary crosslinking agent includes at least one of triallyl cyanurate, triallyl isocyanurate, ethylene glycol dimethacrylate, ethyl dimethacrylate, triethylene glycol dimethacrylate, triallyl trimellitate, trimethylolpropane trimethacrylate, ethylene glycol dimethacrylate, N,N'-m-phenylene bismaleimide, N,N'-bis(furfurylidene)acetone, 1,2-polybutadiene, and sulfur. The triallyl cyanurate, the triallyl isocyanurate, the ethylene glycol dimethacrylate, the triethylene glycol dimethacrylate, and the trimethylolpropane trimethacrylate are auxiliary crosslinking agents with a radiation sensitization function.

Based on 100 parts by weight of the rubber matrix, the crosslinking system further includes 0 to 3 parts of a vulcanization accelerator, and the vulcanization accelerator includes at least one of 2-mercaptobenzothiazole, dibenzothiazyl disulfide, tetramethylthiuram monosulfide, tetramethylthiuram disulfide, tetraethylthiuram disulfide, N-cyclohexyl-2-benzothiazolesulfenamide, N,N-dicyclohexyl-2-benzothiazolesulfenamide, bismaleimide, and ethylene thiourea.

The rubber composition also includes auxiliary components, and based on 100 parts by weight of the rubber matrix, the auxiliary components include, in parts by weight, the following components:
  2 to 10 parts of a metal oxide,
  5 to 50 parts of a plasticizer,
  0 to 10 parts of a coloring agent,
  30 to 200 parts of an inorganic filler,
  1 to 3 parts of a stabilizer, and
  1 to 2 parts of a coupling agent.

The metal oxide includes at least one of zinc oxide, magnesium oxide, calcium oxide, lead monoxide, and lead tetraoxide.

The plasticizer includes at least one of pine tar, engine oil, naphthenic oil, paraffin oil, coumarone, RX-80, stearic acid, and paraffin. The reasonable use of the plasticizer can increase the elasticity of the rubber and the plasticity suitable for technological operation. For application occasions with adhesion requirements, in order to increase the adhesion, additives with a adhesion increasing effect, such as pine tar, coumarone, RX-80 and liquid polyisobutylene, can also be used preferably.

The coloring agent includes at least one of carbon black, titanium pigment, pigment blue, and pigment green.

The inorganic filler includes at least one of calcium carbonate, talcum powder, calcined clay, magnesium silicate, and magnesium carbonate.

The stabilizer includes at least one of 2,2,4-trimethyl-1,2-dihydroquinoline polymer (RD), 6-ethoxy-2,2,4-trimethyl-1,2-dihydroquinoline (AW), and 2-mercaptobenzimidazole (MB).

The coupling agent includes at least one of vinyl tris(2-methoxyethoxy)silane (A-172), γ-glycidyloxypropyl trimethoxysilane (A-187), and γ-mercaptopropyl trimethoxysilane (A-189).

The rubber composition of the present invention can exist in a form of a uncrosslinked rubber mix, and can exist in a form of vulcanized rubber after further crosslinking reaction. The vulcanized rubber may also be simply referred to as vulcanizate.

A wire is provided, which includes a conductor and an insulating layer, wherein the insulating layer includes the rubber composition.

The production method of the wire comprises the following technological processes: (1) performing stranding; (2) extruding a rubber insulating layer; (3) performing vulcanization; and (4) performing a spark high-pressure test.

The preparation method of the insulating layer comprises the following steps:
  step 1, rubber mixing:
    firstly, sequentially adding other components of the rubber composition than the crosslinking system to an internal mixer according to parts by weight and performing mixing, adding the crosslinking system and performing mixing uniformly, and then, discharging the mixture to obtain a rubber mix for later use; and
  step 2, continuous extrusion and high-temperature vulcanization:
    extruding the rubber mix obtained in step 1 as an insulating material by means of an extruding machine, coating the stranded wire with the insulating material, and performing high-temperature steam vulcanization to form a wire and cable insulating layer.

A cable is provided, which includes a conductor, an insulating layer, and a sheath layer, wherein at least one of the insulating layer and the sheath layer includes the rubber composition.

The production method of the cable comprises the following technological processes: (1) performing stranding; (2) extruding a rubber insulating layer; (3) performing vulcanization; (4) performing a spark high-pressure test; (5) forming the cable; (6) extruding a rubber sheath; (7) performing vulcanization; (8) performing lettering; and (9) obtaining a finished product.

The preparation method of the insulating layer or the sheath layer comprises the following steps:
  step 1, rubber mixing:
    firstly, sequentially adding other components of the rubber composition than the crosslinking system to an internal mixer according to parts by weight and performing mixing, adding the crosslinking system and performing mixing uniformly, and then, discharging the mixture to obtain a rubber mix for later use; and
  step 2, continuous extrusion and high-temperature vulcanization:
    extruding the rubber mix obtained in step 1 as an insulating material by means of an extruding machine and coating the stranded wire with the insulating material, or extruding the rubber mix obtained in step 1 as a sheath material by means of an extruding machine and coating the cable with the sheath material, and performing high-temperature steam vulcanization to form a wire and cable insulating layer or a sheath layer.

A method for producing a cable is provided. The crosslinking system of the rubber compound used for the insulating layer or the sheath layer of the cable includes a radiation-sensitized auxiliary crosslinking agent. The production method comprises the following technological processes: (1) performing stranding; (2) extruding a rubber insulating layer; (3) performing radiation vulcanization; (4) performing a spark high-pressure test; (5) forming the cable; (6) extruding a rubber sheath; (7) performing radiation vulcanization; (8) performing lettering; and (9) obtaining a finished product.

The preparation method of the insulating layer or the sheath layer comprises the following steps:
  step 1, rubber mixing:
    firstly, sequentially adding other components of the rubber composition than the crosslinking system to an internal mixer according to parts by weight and performing mixing, adding the radiation-sensitized auxiliary crosslinking agent and performing mixing uniformly, and then, discharging the mixture to obtain a rubber mix for later use; and
  step 2, continuous extrusion and radiation crosslinking:
    extruding the rubber mix obtained in step 1 as an insulating material by means of an extruding machine and coating the stranded wire with the insulating material, or extruding the rubber mix obtained in step 1 as a sheath material by means of an extruding machine and coating the cable with the sheath material, and performing radiation crosslinking to form a wire and cable insulating layer or a sheath layer.

A glove is provided, and the rubber compound used includes the rubber composition.

The production method of the glove comprises the following steps:
  (1) rubber mixing: firstly, sequentially adding other components of the rubber composition than the crosslinking system to an internal mixer according to parts by weight and performing mixing, adding the crosslinking system and performing mixing uniformly, and then, discharging the mixture to obtain a rubber mix for later use;
  (2) latex preparation: dissolving the rubber mix in an alkane solvent, and then, performing emulsification and dispersion to obtain latex;
  (3) dip forming: cleaning and baking a mold, and then, performing coagulating agent dipping, drying, latex dipping, lifting, high-temperature crosslinking, standing, bead coating, crimping, demolding and tidying to obtain the glove.

A condom is provided, and the rubber compound used includes the rubber composition.

The crosslinking system in the rubber composition used includes a radiation-sensitized auxiliary crosslinking agent.

The production method of the condom comprises the following steps:

(1) rubber mixing:

firstly, sequentially adding other components of the rubber composition than the crosslinking system to an internal mixer according to parts by weight and performing mixing, adding the radiation-sensitized auxiliary crosslinking agent and performing mixing uniformly, and then, discharging the mixture to obtain a rubber mix for later use;

(2) emulsification:

fully dissolving the rubber mix obtained in step 1 in an alkane solvent for emulsifying the rubber mix, and then, removing the solvent to obtain latex;

(3) radiation crosslinking:

allowing the latex obtained in step 2 to stand, drying the latex to form a film, performing radiation crosslinking in air at normal temperature, and performing crimping, demolding and tidying to obtain the condom.

In the present invention, the stearic acid can play a role of an activating agent in a sulfur vulcanization system and can form a soluble salt together with a metal oxide so as to enhance the activation of the metal oxide to an accelerator.

The present invention also provides a rubber plug, and the rubber compound used includes the rubber composition.

The rubber plug provided by the present invention is suitable for being used as a medical rubber plug.

The present invention also provides a method for producing the rubber plug, which uses a mold pressing vulcanization process and comprises the following steps:

(1) rubber mixing: firstly, sequentially adding other components of the rubber composition than the crosslinking system to an internal mixer according to parts by weight and performing mixing, adding the crosslinking system and performing mixing uniformly, then, discharging the mixture to obtain a rubber mix, performing open milling and sheet pressing on the rubber mix on an open mill, and then, allowing the rubber mix to stand for later use;

(2) calendering: calendering the rubber mix on a calender to be preformed, and then, performing cooling;

(3) vulcanization: putting the calendered rubber into a mold to be subjected to mold pressing vulcanization for a preset vulcanization time, and then, performing demolding and cooling;

(4) after-treatment: performing trimming, cleaning and silicification to obtain a finished product, and packaging and warehousing the finished product.

The present invention also provides a method for producing the rubber plug, which uses an injection vulcanization process and comprises the following steps:

(1) rubber mixing: firstly, sequentially adding other components of the rubber composition than the crosslinking system to an internal mixer according to parts by weight and performing mixing, adding the crosslinking system and performing mixing uniformly, then, discharging the mixture to obtain a rubber mix, performing open milling and sheet pressing on the rubber mix on an open mill, and then, allowing the rubber mix to stand for later use;

(2) extrusion: extruding the rubber mix into a strip shape by means of an extruding machine, and allowing the strip-shaped rubber mix to stand for later use;

(3) vulcanization: vulcanizing the extruded rubber by means of an injection forming vulcanizer;

(4) after-treatment: performing trimming, cleaning and silicification to obtain a finished product, and packaging and warehousing the finished product. The rubber plug production process provided by the present invention can further comprise a coating process so as to enhance the mechanical lubricity of the rubber plug and improve the long-term stability of the packaged product. The used film material may be at least one selected from the group consisting of a polydimethylsiloxane film, a parylene film, an ethylene-tetrafluoroethylene copolymer film, and a polyester film.

The present invention also provides a catheter, and the rubber compound used includes the rubber composition.

The catheter provided by the present invention is suitable for being used as a medical catheter or a food catheter.

The present invention also provides a method for producing the catheter. A forming mode of the catheter is extrusion forming or mold pressing forming, and a vulcanization mode of the catheter is selected from one of mold pressing vulcanization, high-temperature steam vulcanization, and radiation crosslinking. The forming mode is preferably an extrusion forming mode. The high-temperature steam vulcanization process is suitable for a peroxide crosslinking system. The peroxide is preferably bis(2,4-dichlorobenzoyl peroxide) or 2,5-dimethyl-2,5-di(tert-butylperoxy)hexane. The peroxide addition form is further preferably paste. The radiation crosslinking process is suitable for a radiation crosslinking system. By using the radiation crosslinking system, the dosage of chemical additives can be reduced, and thus, products are more suitable for the medical field or the food field.

Compared with the prior art, the present invention has the following beneficial effects: (1) the rubber composition of the present invention simultaneously has good aging resistance and crosslinking capability; (2) the present invention uses the branched polyethylene without a third monomer of dienes, so that the electrical insulation property is similar to that of the ethylene propylene rubber and higher crosslinking efficiency and mechanical strength in a crosslinking reaction process are realized; when the rubber matrix includes the branched polyethylene, the rubber composition can effectively solve the problems of crosslinking efficiency and mechanical strength in the prior art, simultaneously obtains good electrical insulation properties and mechanical strength, and can be better applied to wires and cables; (3) the coloring agent in the present invention has no carbon black or a very small amount of carbon black, so that the insulating property is good; (4) due to high mechanical strength and no protein, the rubber composition prepared according to the present invention has no allergy risk, can be used for manufacturing condoms, gloves, rubber plugs, medical catheters and the like by means of a radiation crosslinking process or a chemical crosslinking process, and has a wide scope of application.

DETAILED DESCRIPTION

The present invention is further described through examples, but such examples are not intended to limit the scope of the present invention. Some non-essential improvements and adjustments made by those skilled in the art to the present invention shall also fall within the protection scope of the present invention.

For the EPM used, the Mooney viscosity ML(1+4) at 125° C. is preferably 20 to 50, and the ethylene content is preferably 45% to 60%.

For the EPDM used, the Mooney viscosity ML(1+4) at 125° C. is preferably 20 to 100, the ethylene content is preferably 55% to 75%, the third monomer is 5-ethylidene-2-norbornene, 5-vinyl-2-norbornene or dicyclopentadiene, and the content of the third monomer is 1% to 7%.

The branched polyethylene used can be obtained by catalyzing ethylene homopolymerization by means of an (α-diimine) nickel catalyst under the action of a co-catalyst. The structure and synthetic method of the used (α-diimine) nickel catalyst and the method for preparing the branched polyethylene by means of the (α-diimine) nickel catalyst are disclosed in the prior art, and can use but are not limited to the following literatures: CN102827312A, CN101812145A, CN101531725A, CN104926962A, U.S. Pat. Nos. 6,103,658, and 6,660,677.

The branched polyethylene involved in the examples has the following characteristics: the degree of branching is 60 to 130 branches/1000 carbon atoms, the weight average molecular weight is 66,000 to 518,000, and the Mooney viscosity ML(1+4) at 125° C. is 6 to 102. The degree of branching is measured by nuclear magnetic hydrogen spectroscopy, and the molar percentages of various branches are measured by nuclear magnetic carbon spectroscopy.

The specific parameters of the branched polyethylene used in the following specific examples are as shown in table 1.

TABLE 1

Specific parameters of branched polyethylene

| Branched polyethylene No. | Degree of branching | Methyl/ % | Ethyl/ % | Propyl/ % | Butyl/ % | Pentyl/ % | Hexyl or higher branch/ % | Weight average molecular weight/ 10,000 | Molecular weight distribution | Mooney viscosity ML(1 + 4) 125° C. |
|---|---|---|---|---|---|---|---|---|---|---|
| PER-1 | 130 | 46.8 | 18.3 | 8.3 | 6.7 | 5.2 | 14.7 | 6.6 | 2.2 | 6 |
| PER-2 | 116 | 51.2 | 17.6 | 8.2 | 5.8 | 5.1 | 12.1 | 20.1 | 2.1 | 23 |
| PER-3 | 105 | 54.0 | 13.7 | 6.4 | 5.3 | 5.1 | 15.5 | 26.8 | 2.1 | 42 |
| PER-4 | 102 | 56.2 | 12.9 | 6.2 | 5.2 | 4.9 | 14.6 | 27.9 | 2.1 | 52 |
| PER-5 | 99 | 59.6 | 11.6 | 5.8 | 4.9 | 5.1 | 13.0 | 28.3 | 1.8 | 63 |
| PER-6 | 90 | 62.1 | 9.4 | 5.4 | 4.6 | 4.5 | 14.0 | 32.1 | 2.1 | 77 |
| PER-7 | 82 | 64.2 | 8.7 | 5.3 | 4.2 | 3.9 | 13.7 | 35.6 | 1.7 | 80 |
| PER-8 | 70 | 66.5 | 7.2 | 4.6 | 3.2 | 3.2 | 15.3 | 43.6 | 2.1 | 93 |
| PER-9 | 60 | 68.1 | 7.1 | 4.2 | 2.7 | 2.8 | 15.1 | 51.8 | 2.2 | 102 |
| PER-10 | 87 | 61.8 | 10.3 | 5.4 | 4.6 | 4.9 | 12.0 | 40.1 | 1.8 | 101 |
| PER-11 | 94 | 60.5 | 10.8 | 5.7 | 4.7 | 4.9 | 13.3 | 37.8 | 2.0 | 85 |
| PER-12 | 102 | 56.8 | 12.7 | 6.1 | 5.2 | 5.1 | 13.9 | 34.8 | 1.9 | 66 |

Unless otherwise specified, rubber performance test methods in specific examples and related experiments are as follows:
1. Hardness test: the test is performed by using a hardness tester in accordance with the national standard GB/T 531.1-2008, wherein the test temperature is room temperature.
2. Tensile strength and elongation at break performance test: the test is performed by using an electronic tensile tester in accordance with the national standard GB/T528-2009, wherein the tensile speed is 500 mm/min, the test temperature is 23±2° C., and the sample is a type 2 dumbbell sample.
3. Mooney viscosity test: the test is performed by using a Mooney viscosity tester in accordance with the national standard GB/T1232.1-2000, wherein the test temperature is 125° C., the preheating time is 1 min, and the test time is 4 min.
4. Hot air accelerated aging test: the test is performed in a heat aging test box in accordance with the national standard GB/T3512-2001, wherein the test condition is 150° C.*72 h.
5. Volume resistivity test: the test is performed by using a megger in accordance with the national standard GB/T1692-2008.
6. Test of top optimum cure time Tc90: the test is performed in a rotorless vulcanizer in accordance with the national standard GB/T16584-1996, wherein the test temperature is 160° C.

Example 1

Branched polyethylene No. PER-9 was used.
The processing method was as follows:
(1) rubber mixing: the temperature of an internal mixer was set to be 100° C. and the rotor speed was set to be 50 r/min, 90 parts of EPM and 10 parts of branched polyethylene were added, and pre-pressed and mixed for 90 s; 5 parts of zinc oxide, 1 part of stearic acid, and 2 parts of an anti-aging agent RD were added, and mixed for 30 s; then, 100 parts of talcum powder and 20 parts of paraffin oil SUNPAR2280 were added to the rubber, and mixed for 3 min; finally, 3 parts of a crosslinking agent dicumyl peroxide (DCP) and 1 part of an auxiliary crosslinking agent triallyl isocyanurate (TAIC) were added, and mixed for 2 min, and then, the rubber was discharged; the rubber mix was plasticated on an open mill of which the roller temperature was 60° C. to obtain a sheet of which the thickness was about 2.5 mm, and the sheet was allowed to stand for 20 h;
(2) vulcanization: vulcanization was performed for 30 min at 160° C. under the pressure of 16 MPa, the vulcanized product was allowed to stand for 16 h, and then, various tests were performed.

Example 2

Branched polyethylene No. PER-2 was used.
The processing method was as follows:
(1) rubber mixing: the temperature of an internal mixer was set to be 60° C. and the rotor speed was set to be 50 r/min, 70 parts of EPM and 30 parts of branched polyethylene were added, and pre-pressed and mixed for 90 s; 5 parts of zinc oxide, 1 part of stearic acid, and 2 parts of an anti-aging agent RD were added, and mixed for 30 s; then, 100 parts of talcum powder and 10 parts of paraffin oil SUNPAR2280 were added to the rubber, and mixed for 3 min; finally, 3 parts of a crosslinking agent DCP and 0.3 part of sulfur were added, and mixed for 2 min, and then, the rubber was discharged; the rubber mix was plasticated on an open mill of which the roller temperature was 40° C. to obtain a sheet of which the thickness was about 2.5 mm, and the sheet was allowed to stand for 20 h;
(2) vulcanization: vulcanization was performed for 30 min at 160° C. under the pressure of 16 MPa, the vulcanized product was allowed to stand for 16 h, and then, various tests were performed.

Example 3

Branched polyethylene No. PER-4 was used.
The processing method was as follows:
(1) rubber mixing: the temperature of an internal mixer was set to be 80° C. and the rotor speed was set to be 50 r/min, 50 parts of EPM and 50 parts of branched polyethylene were added, and pre-pressed and mixed for 90 s; 5 parts of zinc oxide, 1 part of stearic acid, and 2 parts of an anti-aging agent RD were added, and mixed for 30 s; then, 100 parts of talcum powder and 20 parts of paraffin oil SUNPAR2280 were added to the rubber, and mixed for 3 min; finally, 3 parts of a crosslinking agent DCP and 1 part of an auxiliary crosslinking agent TAIC were added, and mixed for 2 min, and then, the rubber was discharged; the rubber mix was plasticated on an open mill of which the roller temperature was 60° C. to obtain a sheet of which the thickness was about 2.5 mm, and the sheet was allowed to stand for 20 h;
(2) vulcanization: vulcanization was performed for 30 min at 160° C. under the pressure of 16 MPa, the vulcanized product was allowed to stand for 16 h, and then, various tests were performed.

Example 4

Branched polyethylene No. PER-3 was used.
The processing method was as follows:
(1) rubber mixing: the temperature of an internal mixer was set to be 80° C. and the rotor speed was set to be 50 r/min, 100 parts of branched polyethylene was added, and pre-pressed and mixed for 90 s; 5 parts of zinc oxide, 1 part of stearic acid, and 2 parts of an anti-aging agent RD were added, and mixed for 30 s; then, 100 parts of talcum powder and 20 parts of paraffin oil SUNPAR2280 were added to the rubber, and mixed for 3 min; finally, 3 parts of a crosslinking agent DCP and 1 part of an auxiliary crosslinking agent TAIC were added, and mixed for 2 min, and then, the rubber was discharged; the rubber mix was plasticated on an open mill of which the roller temperature was 60° C. to obtain a sheet of which the thickness was about 2.5 mm, and the sheet was allowed to stand for 20 h;
(2) vulcanization: vulcanization was performed for 30 min at 160° C. under the pressure of 16 MPa, the vulcanized product was allowed to stand for 16 h, and then, various tests were performed.

Example 5

Branched polyethylene No. PER-9 was used.
The processing method was as follows:
(1) rubber mixing: the temperature of an internal mixer was set to be 100° C. and the rotor speed was set to be 50 r/min, 85 parts of EPDM and 15 parts of branched polyethylene were added, and pre-pressed and mixed for 90 s; 5 parts of zinc oxide, 5 part of lead tetraoxide, 1 part of stearic acid, and 2 parts of an anti-aging agent RD were added, and mixed for 30 s; then, 120 parts of talcum powder, 5 parts of a coloring agent carbon black N550, and 20 parts of paraffin oil SUNPAR2280 were added to the rubber, and mixed for 3 min; finally, 1.5 parts of sulfur, 1.5 parts of an accelerator N-cyclohexyl-2-benzothiazolesulfenamide, and 0.4 part of an accelerator tetramethylthiuram disulfide were added, and mixed for 2 min, and then, the rubber was discharged; the rubber mix was plasticated on an open mill of which the roller temperature was 60° C. to obtain a sheet of which the thickness was about 2.5 mm, and the sheet was allowed to stand for 20 h;
(2) vulcanization: vulcanization was performed for 15 min at 160° C. under the pressure of 16 MPa, the vulcanized product was allowed to stand for 16 h, and then, various tests were performed.

Example 6

Branched polyethylene No. PER-8 was used.
The processing method was as follows:
(1) rubber mixing: the temperature of an internal mixer was set to be 80° C. and the rotor speed was set to be 50 r/min, 30 parts of EPM, 50 parts of EPDM, and 20 parts of branched polyethylene were added, and pre-pressed and mixed for 90 s; 5 parts of zinc oxide, 1 part of stearic acid, and 2 parts of an anti-aging agent RD were added, and mixed for 30 s; then, 120 parts of talcum powder, 5 parts of a coloring agent carbon black N550, and 20 parts of paraffin oil SUNPAR2280 were added to the rubber, and mixed for 3 min; finally, 3 parts of a crosslinking agent DCP and 1 part of an auxiliary crosslinking agent TAIC were added, and mixed for 2 min, and then, the rubber was discharged; the rubber mix was plasticated on an open mill of which the roller temperature was 60° C. to obtain a sheet of which the thickness was about 2.5 mm, and the sheet was allowed to stand for 20 h;
(2) vulcanization: vulcanization was performed for 30 min at 160° C. under the pressure of 16 MPa, the vulcanized product was allowed to stand for 16 h, and then, various tests were performed.

Example 7

Branched polyethylene No. PER-5 was used.
The processing method was as follows:
(1) rubber mixing: the temperature of an internal mixer was set to be 80° C. and the rotor speed was set to be 50 r/min, 50 parts of EPDM and 50 parts of branched polyethylene were added, and pre-pressed and mixed for 90 s; 10 parts of zinc oxide, 1 part of stearic acid, and 2 parts of an anti-aging agent RD were added, and mixed for 30 s; then, 120 parts of talcum powder, 5 parts of a coloring agent carbon black N550, and 40 parts of paraffin oil SUNPAR2280 were added to the rubber, and mixed for 3 min; finally, 1.5 parts of a crosslinking agent DCP and 0.3 part of an auxiliary crosslinking agent TAIC were added, and mixed for 2 min, and then, the rubber was discharged; the rubber mix was plasticated on an open mill of which the roller temperature was 60° C. to obtain a sheet of which the thickness was about 2.5 mm, and the sheet was allowed to stand for 20 h;
(2) vulcanization: vulcanization was performed for 30 min at 160° C. under the pressure of 16 MPa, the vulcanized product was allowed to stand for 16 h, and then, various tests were performed.

Example 8

Branched polyethylene No. PER-6 was used.
The processing method was as follows:
(1) rubber mixing: the temperature of an internal mixer was set to be 80° C. and the rotor speed was set to be 50 r/min, 30 parts of EPDM and 70 parts of branched polyethylene were added, and pre-pressed and mixed for 90 s; 10 parts of zinc oxide, 2 parts of stearic acid, and 2 parts of an anti-aging agent RD were added, and mixed for 30 s; then, 120 parts of talcum powder, 80 parts of calcined clay, 1 part of vinyl tris(2-methoxyethoxy)silane, 5 parts of a coloring agent carbon black N550, and 20 parts of paraffin oil SUNPAR2280 were added to the rubber, and mixed for 3 min; finally, 5 parts of a crosslinking agent DCP, 2 parts of an auxiliary crosslinking agent TAIC, and 8 parts of an auxiliary crosslinking agent 1,2-polybutadiene were added, and mixed for 2 min, and then, the rubber was discharged; the rubber mix was plasticated on an open mill of which the roller temperature was 60° C. to obtain a sheet of which the thickness was about 2.5 mm, and the sheet was allowed to stand for 20 h;
(2) vulcanization: vulcanization was performed for 30 min at 160° C. under the pressure of 16 MPa, the vulcanized product was allowed to stand for 16 h, and then, various tests were performed.

Example 9

Branched polyethylene No. PER-5 was used.
The processing method was as follows:
(1) rubber mixing: the temperature of an internal mixer was set to be 80° C. and the rotor speed was set to be 50 r/min, 100 parts of branched polyethylene was added, and pre-pressed and mixed for 90 s; 5 parts of zinc oxide, 1 part of stearic acid, and 2 parts of an anti-aging agent RD were added, and mixed for 30 s; then, 120 parts of calcined clay, 2 parts of vinyl tris(2-methoxyethoxy)silane, 5 parts of a coloring agent carbon black N550, and 20 parts of paraffin oil SUNPAR2280 were added to the rubber, and mixed for 3 min; finally, 3 parts of a crosslinking agent DCP and 1 part of an auxiliary crosslinking agent TAIC were added, and mixed for 2 min, and then, the rubber was discharged; the rubber mix was plasticated on an open mill of which the roller temperature was 60° C. to obtain a sheet of which the thickness was about 2.5 mm, and the sheet was allowed to stand for 20 h;
(2) vulcanization: vulcanization was performed for 30 min at 160° C. under the pressure of 16 MPa, the vulcanized product was allowed to stand for 16 h, and then, various tests were performed.

The rubber composition in the examples 1 to 9 was extruded as an insulating material by means of an extruding machine to coat the stranded wire to form an insulating layer, then, the wire was vulcanized in a vulcanization tank, a wire and cable product was obtained after product tests, and then, the product was coated with a rubber sheath in an extruding mode, vulcanized in a high-temperature vulcanization hose and lettered to obtain a wire and cable finished product.

Comparative Example 1

The processing method was as follows:
(1) rubber mixing: the temperature of an internal mixer was set to be 80° C. and the rotor speed was set to be 50 r/min, 100 parts of EPM was added, and pre-pressed and mixed for 90 s; 5 parts of zinc oxide, 1 part of stearic acid, and 2 parts of an anti-aging agent RD were added, and mixed for 30 s; then, 100 parts of talcum powder and 20 parts of paraffin oil SUNPAR2280 were added to the rubber, and mixed for 3 min; finally, 3 parts of a crosslinking agent DCP and 1 part of an auxiliary crosslinking agent TAIC were added, and mixed for 2 min, and then, the rubber was discharged; the rubber mix was plasticated on an open mill of which the roller temperature was 60° C. to obtain a sheet of which the thickness was about 2.5 mm, and the sheet was allowed to stand for 20 h;
(2) vulcanization: vulcanization was performed for 30 min at 160° C. under the pressure of 16 MPa, the vulcanized product was allowed to stand for 16 h, and then, various tests were performed.

Comparative Example 2

The processing method was as follows:
(1) rubber mixing: the temperature of an internal mixer was set to be 80° C. and the rotor speed was set to be 50 r/min, 100 parts of EPDM was added, and pre-pressed and mixed for 90 s; 5 parts of zinc oxide, 1 part of stearic acid, and 2 parts of an anti-aging agent RD were added, and mixed for 30 s; then, 120 parts of talcum powder, 5 parts of a coloring agent carbon black N550, and 20 parts of paraffin oil SUNPAR2280 were added to the rubber, and mixed for 3 min; finally, 3 parts of a crosslinking agent DCP and 1 part of an auxiliary crosslinking agent TAIC were added, and mixed for 2 min, and then, the rubber was discharged; the rubber mix was plasticated on an open mill of which the roller temperature was 60° C. to obtain a sheet of which the thickness was about 2.5 mm, and the sheet was allowed to stand for 20 h;
(2) vulcanization: vulcanization was performed for 30 min at 160° C. under the pressure of 16 MPa, the vulcanized product was allowed to stand for 16 h, and then, various tests were performed.

The performance test results of the rubber in the examples 1 to 9 and the comparative examples 1 to 2 were as shown in table 2.

TABLE 2

Performance test results of rubber in examples 1 to 9 and comparative examples 1 to 2

| Test item | Comparative example 1 | Example 1 | Example 2 | Example 3 | Example 4 | Comparative example 2 | Example 5 | Example 6 | Example 7 | Example 8 | Example 9 |
|---|---|---|---|---|---|---|---|---|---|---|---|
| Hardness | 61 | 66 | 63 | 63 | 64 | 70 | 78 | 68 | 69 | 79 | 72 |
| Tensile strength/MPa | 7.1 | 7.8 | 7.6 | 8.6 | 11.5 | 8 | 10.8 | 8.3 | 10.8 | 12.5 | 12.4 |

TABLE 2-continued

Performance test results of rubber in examples 1 to 9 and comparative examples 1 to 2

| Test item | Comparative example 1 | Example 1 | Example 2 | Example 3 | Example 4 | Comparative example 2 | Example 5 | Example 6 | Example 7 | Example 8 | Example 9 |
|---|---|---|---|---|---|---|---|---|---|---|---|
| Elongation at break % | 722 | 533 | 752 | 681 | 663 | 710 | 589 | 642 | 627 | 643 | 653 |
| Volume resistivity/ $\Omega \cdot cm$ | $2.8 \times 10^{16}$ | $2.7 \times 10^{16}$ | $2.6 \times 10^{16}$ | $2.6 \times 10^{16}$ | $2.6 \times 10^{16}$ | $1.5 \times 10^{15}$ | $2.6 \times 10^{14}$ | $5.3 \times 10^{15}$ | $6.7 \times 10^{15}$ | $7.9 \times 10^{15}$ | $1.8 \times 10^{16}$ |
| After aging (at 150° C. for 168 h) | | | | | | | | | | | |
| Hardness | 65 | 67 | 66 | 66 | 67 | 73 | 80 | 70 | 72 | 81 | 74 |
| Retention rate of tensile strength/% | 92 | 93 | 92 | 94 | 97 | 83 | 89 | 88 | 92 | 97 | 102 |
| Retention rate of elongation at break/% | 94 | 95 | 93 | 98 | 96 | 68 | 82 | 82 | 94 | 94 | 103 |

Example 10

Branched polyethylene No. PER-6 was used.
The processing method was as follows:
(1) rubber mixing: the temperature of an internal mixer was set to be 90° C. and the rotor speed was set to be 50 r/min, 100 parts of branched polyethylene was added, and pre-pressed and mixed for 90 s; 10 parts of zinc oxide was added, and mixed for 30 s; then, 100 parts of calcined clay, 2 parts of vinyl tris(2-methoxyethoxy)silane, and 10 parts of paraffin oil SUNPAR2280 were added to the rubber, and mixed for 3 min; finally, 1 part of a radiation-sensitized auxiliary crosslinking agent trimethylolpropane trimethacrylate was added, and mixed for 2 min, and then, the rubber was discharged; the rubber mix was plasticated on an open mill of which the roller temperature was 80° C., then, the plasticated rubber mix was pressed on a press vulcanizer at 120° C. to obtain a sheet of which the thickness was 0.5 mm, and the sheet was allowed to stand for 20 h;
(2) crosslinking: radiation crosslinking was performed in air at normal temperature, wherein the electron beam energy for radiation was 1.0 MeV, the beam intensity was 1.0 mA, and the radiation dose was 200 kGy; the crosslinked product was allowed to stand for 96 h, and then, various tests were performed.

Example 11

Branched polyethylene No. PER-6 was used.
The processing method was as follows:
(1) rubber mixing: the temperature of an internal mixer was set to be 90° C. and the rotor speed was set to be 50 r/min, 100 parts of branched polyethylene was added, and pre-pressed and mixed for 90 s; 10 parts of zinc oxide was added, and pre-pressed and mixed for 30 s; then, 100 parts of calcined clay, 2 parts of vinyl tris(2-methoxyethoxy)silane, and 10 parts of paraffin oil SUNPAR2280 were added to the rubber, and mixed for 3 min; finally, 6 parts of a radiation-sensitized auxiliary crosslinking agent trimethylolpropane trimethacrylate was added, and mixed for 2 min, and then, the rubber was discharged; the rubber mix was plasticated on an open mill of which the roller temperature was 80° C., then, the plasticated rubber mix was pressed on a press vulcanizer at 120° C. to obtain a sheet of which the thickness was 0.5 mm, and the sheet was allowed to stand for 20 h;
(2) crosslinking: radiation crosslinking was performed in air at normal temperature, wherein the electron beam energy for radiation was 1.0 MeV, the beam intensity was 1.0 mA, and the radiation dose was 100 kGy; the crosslinked product was allowed to stand for 96 h, and then, various tests were performed.

Example 12

Branched polyethylene No. PER-7 was used.
The processing method was as follows:
(1) rubber mixing: the temperature of an internal mixer was set to be 90° C. and the rotor speed was set to be 50 r/min, 100 parts of branched polyethylene was added, and pre-pressed and mixed for 90 s; then, 6 parts of a radiation-sensitized auxiliary crosslinking agent trimethylolpropane trimethacrylate was added, and mixed for 3 min, and then, the rubber was discharged; the rubber mix was fully dissolved in a hexane solvent for emulsifying the rubber mix, and then, the solvent was removed to obtain latex;
(2) crosslinking: the latex was allowed to stand, and dried to form a film, and then, radiation crosslinking was performed in air at normal temperature, wherein the electron beam energy for radiation was 1.0 MeV, the beam intensity was 1.0 mA, and the radiation dose was 100 kGy; the crosslinked product was allowed to stand for 96 h, and then, various tests were performed.
The rubber composition in the present example was mixed, dissolved and emulsified to obtain latex, then, a specific mold was dipped in the latex several times and dried, radiation vulcanization was performed, and then, the vulcanized product was subjected to crimping, demolding, tidying, electrical inspection and packaging to finally obtain a condom finished product.

Example 13

Branched polyethylene No. PER-7 was used.
The processing method was as follows:
(1) rubber mixing: the temperature of an internal mixer was set to be 90° C. and the rotor speed was set to be 50 r/min, 30 parts of EPM and 70 parts of branched polyethylene were added, and pre-pressed and mixed for 90 s; then, 6 parts of a radiation-sensitized auxiliary crosslinking agent trimethylolpropane trimethacrylate was added, and mixed for 3 min, and then, the rubber was discharged; the rubber mix was fully dissolved in a hexane solvent for emulsifying, and then, the solvent was removed to obtain latex;
(2) crosslinking: the latex was allowed to stand and dried to form a film, and then, radiation crosslinking was performed in air at normal temperature, wherein the electron beam energy for radiation was 1.0 MeV, the beam intensity was 1.0 mA, and the radiation dose was 100 kGy; the crosslinked product was allowed to stand for 96 h, and then, various tests were performed.

Example 14

Branched polyethylene No. PER-7 was used.
The processing method was as follows:
(1) rubber mixing: the temperature of an internal mixer was set to be 90° C. and the rotor speed was set to be 50 r/min, 50 parts of EPM and 50 parts of branched polyethylene were added, and pre-pressed and mixed for 90 s; then, 6 parts of a radiation-sensitized auxiliary crosslinking agent trimethylolpropane trimethacrylate was added, and mixed for 3 min, and then, the rubber was discharged; the rubber mix was fully dissolved in a hexane solvent for emulsifying, and then, the solvent was removed to obtain latex;
(2) crosslinking: the latex was allowed to stand and dried to form a film, and then, radiation crosslinking was performed in air at normal temperature, wherein the electron beam energy for radiation was 1.0 MeV, the beam intensity was 1.0 mA, and the radiation dose was 100 kGy; the crosslinked product was allowed to stand for 96 h, and then, various tests were performed.

Comparative Example 3

The processing method was as follows:
(1) rubber mixing: the temperature of an internal mixer was set to be 90° C. and the rotor speed was set to be 50 r/min, 100 parts of EPM was added, and pre-pressed and mixed for 90 s; then, 6 parts of a radiation-sensitized auxiliary crosslinking agent trimethylolpropane trimethacrylate was added, and mixed for 3 min, and then, the rubber was discharged; the rubber mix was fully dissolved in a hexane solvent for emulsifying, and then, the solvent was removed to obtain latex;
(2) crosslinking: the latex was allowed to stand and dried to form a film, and then, radiation crosslinking was performed in air at normal temperature, wherein the electron beam energy for radiation was 1.0 MeV, the beam intensity was 1.0 mA, and the radiation dose was 100 kGy; the crosslinked product was allowed to stand for 96 h, and then, various tests were performed.

Performance test results of rubber in the examples 10 to 14 and the comparative example 3 were as shown in table 3.

TABLE 3

Performance test results of rubber in examples 10 to 14 and comparative example 3

| Test item | Example 10 | Example 11 | Example 12 | Example 13 | Example 14 | Comparative example 3 |
|---|---|---|---|---|---|---|
| Hardness | 68 | 73 | | | | |
| Tensile strength/MPa | 7.3 | 13.4 | 26.9 | 21.4 | 16.5 | 9.3 |
| Elongation at break % | 380 | 362 | 823 | 776 | 689 | 613 |
| Volume resistivity/ $\Omega \cdot cm$ | $6.3 \times 10^{16}$ | $6.2 \times 10^{16}$ | | | | |
| After aging (at 150° C. for 168 h) | | | | | | |
| Hardness | 69 | 74 | | | | |
| Retention rate of tensile strength/% | 101 | 102 | 101 | 102 | 101 | 102 |
| Retention rate of elongation at break/% | 103 | 101 | 102 | 102 | 101 | 102 |

Example 15

The present example is a wire. The manufacturing process of the wire was specifically as follows: firstly, stranding was performed; then, the rubber composition in the examples 1 to 9 was extruded as an insulating material by means of an extruding machine to coat the stranded wire to form an insulating layer; then, the wire was vulcanized in a vulcanization tank; and a wire product was after product tests.

Example 16

The present example is a production method of a cable. The continuous high-temperature vulcanization manufacturing process of the cable was specifically as follows: firstly, stranding was performed; then, the rubber composition in the examples 1 to 9 was extruded as an insulating material by means of an extruding machine to coat the stranded wire to form an insulating layer; then, the wire was vulcanized in a high-temperature vulcanization hose; a cable was formed after tests; then the cable was coated with a rubber sheath in an extruding mode, vulcanized in the high-temperature vulcanization hose and lettered to obtain a cable finished product.

Example 17

The present example is a condom, and a radiation crosslinking manufacturing process thereof was specifically as follows:
firstly, the rubber composition in the example 12 was mixed, dissolved and emulsified to obtain latex; then, a specific mold was dipped in the latex several times and dried, and radiation vulcanization was performed; and then, crimping, demolding, tidying, electrical inspection and packaging were performed to finally obtain a finished product.

Example 18

The present example is a medical rubber plug, and a mold pressing vulcanization production process thereof comprises the following steps:
(1) rubber mixing: the temperature of an internal mixer was set to be 80° C. and the rotor speed was set to be 50 r/min, 100 parts of branched polyethylene was added, and pre-pressed and mixed for 90 s; 5 parts of zinc oxide and 1 part of stearic acid were added, and mixed for 30 s; then, 100 parts of talcum powder and 10 parts of paraffin oil SUNPAR2280 were added to the rubber, and mixed for 3 min; finally, 3 parts of a crosslinking agent bis(tert-butylperoxydiisopropyl) benzene and 1 part of an auxiliary crosslinking agent TAIC were added, and mixed for 2 min, and then, the rubber was discharged; open milling and batch-out were performed on the rubber mix on an open mill of which the roller temperature was 60° C., the rubber mix was allowed to stand for 20 h, open milling and sheet pressing were performed on the rubber mix on the open mill, and then, the rubber mix was allowed to stand for later use;
(2) calendering: the rubber mix was calendered on a calender so as to be preformed, and then, cooling was performed;
(3) vulcanization: the calendered rubber was put into a mold to be subjected to mold pressing vulcanization for 25 min at 160° C. under the pressure of 15 MPa, and after the preset vulcanization time, demolding and cooling were performed;
(4) after-treatment: trimming, cleaning and silicification were performed to obtain a finished product, and the finished product was packaged and warehoused.

Example 19

The present example is a condom, and a radiation crosslinking manufacturing process thereof comprises the following steps:
(1) rubber mixing: the temperature of an internal mixer was set to be 90° C. and the rotor speed was set to be 40 r/min, 100 parts of branched polyethylene PER-10 was added, and pre-pressed and mixed for 90 s; then, 5 parts of a radiation-sensitized auxiliary crosslinking agent trimethylolpropane trimethacrylate was added, and mixed for 3 min, and then, the rubber was discharged; the rubber mix was fully dissolved in a hexane solvent for emulsifying, and then, the solvent was removed to obtain latex;
(2) forming: a specific mold was dipped in the latex several times and dried so as to be formed;
(3) crosslinking: radiation crosslinking was performed in air at normal temperature, wherein the electron beam energy for radiation was 1.0 MeV, the beam intensity was 1.0 mA, and the radiation dose was 100 kGy;
(4) after-treatment: crimping, demolding, tidying, electrical inspection and packaging were performed to finally obtain a condom finished product.

The obtained condom rubber has a tensile strength of 28.9 MPa and an elongation at break of 683%.

Example 20

The present example is a condom and a radiation crosslinking manufacturing process thereof comprises the following steps:
(1) rubber mixing: the temperature of an internal mixer was set to be 90° C. and the rotor speed was set to be 40 r/min, 100 parts of branched polyethylene PER-12 was added, and pre-pressed and mixed for 90 s; then, 6 parts of a radiation-sensitized auxiliary crosslinking agent trimethylolpropane trimethacrylate was added, and mixed for 3 min, and then, the rubber was discharged; the rubber mix was fully dissolved in a hexane solvent for emulsifying, and then, the solvent was removed to obtain latex;
(2) forming: a specific mold was dipped in the latex several times and dried so as to be formed;
(3) crosslinking: radiation crosslinking was performed in air at normal temperature, wherein the electron beam energy for radiation was 1.0 MeV, the beam intensity was 1.0 mA, and the radiation dose was 120 kGy;
(4) after-treatment: crimping, demolding, tidying, electrical inspection and packaging were performed to finally obtain a condom finished product.

The obtained condom rubber has a tensile strength of 30.6 MPa and an elongation at break of 712%.

Example 21

The present example is a medical catheter, adopting a production process of extrusion forming and high-temperature steam vulcanization which specifically comprises the following steps:
(1) rubber mixing: the temperature of an internal mixer was set to be 80° C. and the rotor speed was set to be 50 r/min, 100 parts of branched polyethylene PER-11 was added, and pre-pressed and mixed for 90 s; then, 10 parts of colorless paraffin oil was added to the rubber, and mixed for 3 min; finally, 5 parts of a crosslinking agent 2,5-dimethyl-2,5-di(tert-butylperoxy)hexane (paste, effective component: 50%) and 1 part of an auxiliary crosslinking agent TAIC were added, and mixed for 2 min, and then, the rubber was discharged; open milling and batch-out were performed on the rubber mix on an open mill of which the roller temperature was 60° C., and then, the rubber mix was allowed to stand for 20 h for later use;
(2) extrusion: extrusion forming was performed on the rubber mix on an extruding machine, wherein the rotation speed of the extruding machine was 50 r/min, and the temperature of a machine head was 90° C.;
(3) crosslinking: firstly, high-temperature steam vulcanization was performed on the extruded rubber for 10 min at 170° C., and then, secondary vulcanization was performed for 4 h at 160° C.;
(4) after-treatment: cleaning was performed to obtain a finished product, and the finished product was packaged and warehoused.

Example 22

The present example is a medical catheter, adopting a production process of extrusion forming and radiation crosslinking which specifically comprises the following steps
(1) rubber mixing: the temperature of an internal mixer was set to be 80° C. and the rotor speed was set to be 50 r/min, 100 parts of branched polyethylene PER-5 was added, and pre-pressed and mixed for 90 s; then, 4 parts of a radiation-sensitized auxiliary crosslinking agent trimethylolpropane trimethacrylate was added, and mixed for 2 min, and then, the rubber was discharged; open milling and batch-out were performed on the rubber mix on an open mill of which the roller temperature was 60° C., and then, the rubber mix was allowed to stand for later use;
(2) extrusion: extrusion forming was performed on the rubber mix on an extruding machine, wherein the rotation speed of the extruding machine was 50 r/min, and the temperature of a machine head was 90° C.;
(3) vulcanization: radiation crosslinking was performed on the extruded rubber at normal temperature, wherein the electron beam energy for radiation was 1.0 MeV, the beam intensity was 1.0 mA, and the radiation dose was 120 kGy;
(4) after-treatment: cleaning was performed to obtain a finished product, and the finished product was packaged and warehoused.

Performance Data Analysis:
1. Comparing the example 3 and the example 4 with the comparative example 1, it can be seen that as the proportion of the branched polyethylene in the rubber matrix increases, the mechanical strength of the vulcanized rubber was significantly improved, and the aging resistance and electrical insulation properties were maintained at the same level;
2. Comparing the example 7 and the example 9 with the comparative example 2, it can be seen that as the proportion of the branched polyethylene in the rubber matrix increases, the mechanical strength, electrical insulation properties and aging resistance of the vulcanized rubber were improved to different degrees.
3. It can be seen from the example 10 and the example 11 that the electrical insulation properties of the vulcanized rubber obtained by radiation crosslinking were better than the electrical insulation properties of the vulcanized rubber obtained by peroxide crosslinking or sulfur crosslinking. Furthermore, it can be seen from the examples 12, 13 and 14 and the comparative example 3 that the branched polyethylene also has better mechanical strength than the EPM in a radiation crosslinking system, and the currently measured mechanical strength can be as high as 26.9 MPa which was close to the mechanical strength of natural latex radiation vulcanization, at least indicating that the branched polyethylene can be used for producing traditional natural latex products, such as condoms and gloves, by means of a radiation crosslinking process.

The comparison of the vulcanization performance test data of the examples 23 and 24 and the comparative example 4 below shows that the branched polyethylene has an excellent crosslinking capability.

The rubber matrix used in the example 23 includes 100 parts of PER-12. The rubber matrix used in the example 24 includes 50 parts of PER-4 and 50 parts of EPDM, wherein the Mooney viscosity ML(1+4) at 125° C. was 60, the ethylene content was 70%, and the ENB content was 5%. The rubber matrix used in the comparative example 3 includes 100 parts of EPDM used in the example 24. Other formulas were identical.

The processing steps of three rubber compositions were as follows:
(1) mixing: the temperature of an internal mixer was set to be 80° C. and the rotor speed was set to be 50 r/min, a rubber matrix was added, and pre-pressed and mixed for 90 s; 5 parts of zinc oxide and 1 part of stearic acid were added, and mixed for 1 min;
(2) then, 100 parts of talcum powder and 20 parts of paraffin oil were added to the rubber, and mixed for 3 min;
(3) finally, 7 parts of a crosslinking agent DCP-40 and 1 part of an auxiliary crosslinking agent TAIC were added, and mixed for 2 min, and then, the rubber was discharged;
(4) the rubber mix was plasticated on an open mill of which the roller temperature was 40° C. to obtain a sheet of which the thickness was about 2.5 mm, the sheet was allowed to stand for 20 h, and then, vulcanization performance was tested;

Test conditions: 175° C. 30 min. Test results were as follows:

|  | Example 23 | Example 24 | Comparative example 4 |
|---|---|---|---|
| ML, dN · m | 0.81 | 0.72 | 0.68 |
| MH, dN · m | 13.14 | 13.24 | 13.36 |
| MH − ML, dN · m | 12.33 | 12.52 | 12.68 |
| Tc90, min | 5.4 | 6.2 | 6.8 |

The Tc90 of the rubber composition in the example 23 was the shortest and was nearly 20% shorter than the Tc90 of the rubber composition in the comparative example 3, and the MH-ML value of the rubber composition in the example 23 was close to the MH-ML value of the rubber composition in the comparative example 3, indicating that the crosslinking density of the rubber composition in the example 23 was close to the crosslinking density of the rubber composition in the comparative example 3. The results can preliminarily show that the branched polyethylene used in the present invention was close to or even better than the conventional EPDM in crosslinking capability.

Although the present invention has been described in detail through the foregoing examples, it should be understood by a person of ordinary skill in the art that modifications or improvements may be made based on the contents disclosed herein without departing from the spirit and scope of the present invention, and such modifications and improvements shall all fall within the spirit and scope of the present invention.

What is claimed is:

1. A rubber composition comprising a rubber matrix and a crosslinking system, wherein the rubber matrix comprises, based on 100 parts by weight of the rubber matrix,
   a branched polyethylene with a content represented as A, in which 0<A≤100 parts, and
   an EPM with a total content represented as B, in which 0≤B<100 parts;
   an EPDM with a total content represented as C, in which 0≤C<100 parts;
   wherein, with respect to 100 parts by weight of the total amount of the rubber matrix, the crosslinking system is represented as D, in which 1≤D<15 parts;
   wherein the crosslinking system comprises at least one of a crosslinking agent and an auxiliary crosslinking agent; and wherein the branched polyethylene comprises an ethylene homopolymer having a branching degree of from about 60 to 99 branches/1000 carbon atoms, a weight average molecular weight of from 66,000 to 518,000, and a Mooney viscosity ML(1+4) at 125° C. of from 6 to 102.

2. The rubber composition according to claim 1, wherein the ethylene homopolymer has a branching degree of from 60 to 94 branches/1000 carbon atoms.

3. The rubber composition according to claim 1, wherein the ethylene homopolymer has a branching degree of from 60 to 90 branches/1000 carbon atoms.

4. The rubber composition according to claim 1, wherein the ethylene homopolymer has a branching degree of from 60 to 87 branches/1000 carbon atoms.

5. The rubber composition according to claim 1, wherein the ethylene homopolymer has a branching degree of from 60 to 82 branches/1000 carbon atoms.

6. The rubber composition according to claim 1, wherein the ethylene homopolymer has a branching degree of from 60 to 70 branches/1000 carbon atoms.

7. The rubber composition according to claim 1, wherein the ethylene homopolymer has a branching degree of 60 branches/1000 carbon atoms, 70 branches/1000 carbon atoms, 82 branches/1000 carbon atoms, 87 branches/1000 carbon atoms, 94 branches/1000 carbon atoms, or 99 branches/1000 carbon atoms.

8. The rubber composition according to claim 1, wherein the ethylene homopolymer has a branching degree of about 60 branches/1000 carbon atoms, about 70 branches/1000 carbon atoms, about 82 branches/1000 carbon atoms, about 87 branches/1000 carbon atoms, 94 branches/1000 carbon atoms, or 99 branches/1000 carbon atoms.

9. The rubber composition according to claim 1, wherein the crosslinking agent comprises at least one of sulfur and a peroxide crosslinking agent, and the peroxide crosslinking agent comprises at least one of di-tert-butyl peroxide, dicumyl peroxide, tert-butyl cumyl peroxide, 1,1-di-tert-butyl peroxide-3,3,5-trimethylcyclohexane, 2,5-dimethyl-2,5-di(tert-butylperoxy)hexane, 2,5-dimethyl-2,5-di(tert-butylperoxy)hexyne-3, bis(tert-butylperoxyisopropyl)benzene, 2,5-dimethyl-2,5-bis(benzoylperoxy)hexane, tert-butyl peroxybenzoate, and tert-butylperoxy-2-ethylhexyl carbonate.

10. The rubber composition according to claim 1, wherein the auxiliary crosslinking agent comprises at least one of triallyl cyanurate, triallyl isocyanurate, ethylene glycol dimethacrylate, ethyl dimethacrylate, triethylene glycol dimethacrylate, triallyl trimellitate, trimethylolpropane trimethacrylate, N,N'-m-phenylene bismaleimide, N,N'-bis(furfurylidene)acetone, 1,2-polybutadiene, and sulfur.

11. The rubber composition according to claim 1, wherein, based on 100 parts by weight of the rubber matrix, the crosslinking system further comprises up to 3 parts of a vulcanization accelerator, and the vulcanization accelerator comprises at least one of 2-mercaptobenzothiazole, dibenzothiazyl disulfide, tetramethylthiuram monosulfide, tetramethylthiuram disulfide, tetraethylthiuram disulfide, N-cyclohexyl-2-benzothiazolesulfenamide, N,N-dicyclohexyl-2-benzothiazolesulfenamide, bismaleimide, and ethylene thiourea.

12. The rubber composition according to claim 1, wherein the rubber composition further comprises, based on 100 parts by weight of the rubber matrix:
   2 to 10 parts of a metal oxide,
   5 to 50 parts of a plasticizer,
   0 to 10 parts of a coloring agent,
   30 to 200 parts of an inorganic filler,
   1 to 3 parts of a stabilizer, and
   1 to 2 parts of a coupling agent.

13. The rubber composition according to claim 12, wherein:
   the rubber metal oxide comprises at least one of zinc oxide, magnesium oxide, calcium oxide, lead monoxide, and lead tetraoxide;
   the plasticizer comprises at least one of pine tar, engine oil, naphthenic oil, paraffin oil, coumarone, stearic acid, and paraffin;
   the coloring agent comprises at least one of carbon black, titanium pigment, pigment blue, and pigment green;
   the inorganic filler comprises at least one of calcium carbonate, talcum powder, calcined clay, magnesium silicate, and magnesium carbonate;
   the stabilizer comprises at least one of 2,2,4-trimethyl-1,2-dihydroquinoline polymer (RD), 6-ethoxy-2,2,4-trimethyl-1,2-dihydroquinoline (AW), and 2-mercaptobenzimidazole (MB); and
   the coupling agent comprises at least one of vinyl tris(2-methoxyethoxy)silane (A-172), γ-glycidyloxypropyl trimethoxysilane (A-187), and γ-mercaptopropyl trimethoxysilane (A-189).

14. A wire comprising a conductor and an insulating layer, wherein the insulating layer comprises a rubber compound formed from the rubber composition according to claim 1.

15. A cable comprising a conductor, an insulating layer, and a sheath layer, wherein at least one of the insulating layer and the sheath layer comprises a rubber compound formed from the rubber composition according to claim 1.

16. A high strength rubber product comprising a rubber compound formed from the rubber composition according to claim 1.

17. The high strength rubber product of claim 16, wherein the high strength rubber product is a glove.

18. The high strength rubber product of claim 16, wherein the high strength rubber product is a condom.

19. The high strength rubber product of claim 16, wherein the crosslinking system in the rubber composition comprises a radiation-sensitized auxiliary crosslinking agent.

20. The high strength rubber product of claim 16, wherein the high strength rubber product is a rubber plug.

* * * * *